(12) United States Patent
Bang et al.

(10) Patent No.: US 10,460,531 B2
(45) Date of Patent: Oct. 29, 2019

(54) SYSTEM AND METHOD FOR GENERATING FACILITY ABNORMALITY PREDICTION MODEL, AND COMPUTER-READABLE RECORDING MEDIUM STORING PROGRAM FOR EXECUTING THE METHOD

(71) Applicants: Industry-University Cooperation Foundation Hanyang University, Seoul (KR); HANWHA PRECISION MACHINERY CO., LTD., Changwon-do (KR)

(72) Inventors: HyunJin Bang, Changwon-si (KR); Cheolhyung Cho, Changwon-si (KR); Kyungtaek Kim, Changwon-si (KR); Deok-Soo Kim, Seoul (KR); Kichun Lee, Seoul (KR); Youngsong Cho, Seoul (KR); Jae-Kwan Kim, Seoul (KR)

(73) Assignees: Industry-University Cooperation Foundation Hanyang University, Seoul (KR); HANWHA PRECISION MACHINERY CO., LTD., Changwon-si (KR)

( * ) Notice: Subject to any disclaimer, the term of this patent is extended or adjusted under 35 U.S.C. 154(b) by 564 days.

(21) Appl. No.: 14/708,927

(22) Filed: May 11, 2015

(65) Prior Publication Data
US 2015/0323425 A1  Nov. 12, 2015

(30) Foreign Application Priority Data
May 12, 2014  (KR) .......................... 10-2014-0056574

(51) Int. Cl.
| | | |
|---|---|---|
| *G01M 99/00* | (2011.01) | |
| *G07C 3/00* | (2006.01) | |
| *G05B 23/02* | (2006.01) | |

(52) U.S. Cl.
CPC ............. *G07C 3/00* (2013.01); *G01M 99/008* (2013.01); *G05B 23/0283* (2013.01); *G05B 2219/32333* (2013.01)

(58) Field of Classification Search
None
See application file for complete search history.

(56) References Cited

U.S. PATENT DOCUMENTS

| | | |
|---|---|---|
| 6,892,191 B1 | 5/2005 | Schaffer |
| 7,603,328 B2 | 10/2009 | Cheng et al. |

(Continued)

FOREIGN PATENT DOCUMENTS

| | | |
|---|---|---|
| JP | 2013-41448 A | 2/2013 |
| KR | 2001-0113779 A | 12/2001 |

(Continued)

OTHER PUBLICATIONS

Communication issued by the Korean Intellectual Property Office dated Jan. 5, 2018 in counterpart Korean Patent Application No. 10-2014-0056574.
Lee, Si-Bok et al., "Development of a Fuzzy-Genetic Algorithm-based Incident Detection Model with Self-adaptation Capability", Journal of Korean Society of Transportation, Aug. 2004, total 17 pages, vol. 22, No. 4.

*Primary Examiner* — Robert K Carpenter
(74) *Attorney, Agent, or Firm* — Sughrue Mion, PLLC

(57) ABSTRACT

A facility abnormality prediction model generation system includes: a data receiver receiving data of sensors of a facility previously obtained during an operation of the facility; an abnormality notification time predictor detecting a malfunction time of a malfunction of the facility based on the data of the sensors and determining an abnormality notification time for pre-notification of the malfunction of (Continued)

the facility based on the detected malfunction time; an optimal sensor combination calculator generating a chromosome based on the data of the sensors and performing a genetic algorithm using the generated chromosome to calculate an optimal sensor combination which is a combination of sensor data related to the determined abnormality notification time; and a facility abnormality prediction model generator generating a facility abnormality prediction model for the pre-notification of the malfunction of the facility, based on the optimal sensor combination.

18 Claims, 10 Drawing Sheets

(56) References Cited

U.S. PATENT DOCUMENTS

| | | | |
|---|---|---|---|
| 7,627,454 B2 * | 12/2009 | LaComb | G05B 23/0229 |
| | | | 702/182 |
| 2008/0215513 A1 | 9/2008 | Weston et al. | |
| 2014/0195184 A1 | 7/2014 | Maeda et al. | |

FOREIGN PATENT DOCUMENTS

| | | |
|---|---|---|
| KR | 10-0560425 B1 | 3/2006 |
| KR | 10-2009-0006437 A | 1/2009 |
| KR | 10-0915339 B1 | 9/2009 |
| KR | 10-2014-0056952 A | 5/2014 |

* cited by examiner

FIG. 7

| 10010000000000 • • • 0000001 | 10010011 | 11110001 |

503 BINARY NUMBERS
INDICATING WHETHER
TO SELECT INPUT VARIABLE

SVM
RBF PARAMETER($\gamma$)

SVM
RBF PARAMETER(C)

SYSTEM AND METHOD FOR GENERATING FACILITY ABNORMALITY PREDICTION MODEL, AND COMPUTER-READABLE RECORDING MEDIUM STORING PROGRAM FOR EXECUTING THE METHOD

CROSS-REFERENCE TO THE RELATED APPLICATION

This application claims priority from Korean Patent Application No. 10-2014-0056574, filed on May 12, 2014, in the Korean Intellectual Property Office, the disclosure of which is incorporated herein in its entirety by reference.

BACKGROUND

1. Field

Apparatuses and methods consistent with exemplary embodiments relate to generating a facility abnormality prediction model, and more particularly, to generating a model capable of predicting facility abnormality by analyzing a relationship between facility data and facility abnormality.

2. Description of the Related Art

Facility data refers to various data obtained from a facility during an operation of the facility, and facility abnormality refers to a defect or malfunction of the facility which is caused by the facility itself. The types of facility abnormality may vary depending on the types of facility functions, and a facility manager may or may not able to diagnose the facility abnormality with respect to the same facility operation according to the degree of the standard of facility abnormality. For example, when a function of the facility is to produce an article, the facility manager may determine that there is a facility abnormality when the article production is less than or equal to a predetermined value. Also, when another function of the facility is to calculate a numerical value, the facility manager may determine that there is a facility abnormality when the numerical value calculated by the facility is greater than or less than a predetermined value.

In the related art, facility abnormality and facility data having clear linearity are defined and various statistical methods are used to find and manage the relationship therebetween. However, the facility data and the facility abnormality do not necessarily have a linear relationship therebetween. When the facility data and the facility abnormality have a nonlinear relationship therebetween, since the relationship therebetween is difficult to find by conventional statistical methods (e.g., multivariate, Statistical Process Control (SPC), and Principal Component Analysis (PCA), it is also difficult to predict the facility abnormality from the facility data and it is difficult to take action if a change point occurs in the facility configuration. Since general facility data does not have normality and homoscedasticity, the facility abnormality may be predicted only when various non-parametric methodologies are found. Thus, according to the related art methods, much time is taken to diagnose the facility abnormality and it is difficult to obtain high-reliability results.

SUMMARY

Exemplary embodiments include systems and methods for providing a relationship model capable of predicting a facility abnormality not only from facility data having a linear relationship with the facility abnormality but also from facility data having a nonlinear relationship with facility abnormality, and predicting the facility abnormality in real time based on the relationship model.

Various aspects will be set forth in part in the description which follows and, in part, will be apparent from the description, or may be learned by practice of the presented embodiments.

According to one or more exemplary embodiments, there is provided a system for establishing a facility abnormality prediction model which may include: a data receiver configured to receive data of sensors of a facility previously obtained during an operation of the facility; an abnormality notification time predictor configured to predict a malfunction time of a malfunction of the facility based on the data of the sensors, and determine an abnormality notification time for pre-notification of the malfunction of the facility based on the detected malfunction time; an optimal sensor combination calculator configured to generate a chromosome based on the data of the sensors, and perform a genetic algorithm using the generated chromosome to calculate an optimal sensor combination which is a combination of sensor data related to the determined abnormality notification time; and a facility abnormality prediction model generator configured to generate a facility abnormality prediction model to be used for the pre-notification of the malfunction of the facility, based on the optimal sensor combination.

The data receiver may receive production data, which is a numerical representation of facility products which are produced whenever an operational cycle of the facility is completed, and the data of the sensors, and synchronize the production data with the data of the sensors based on information about time points when the production data and the data of the sensors are obtained by the data receiver.

The abnormality notification time predictor may predict the malfunction time of the malfunction of the facility based on the data of the sensors considering an accumulated numerical value of defective facility products among the facility products which are produced whenever an operational cycle of the facility is completed.

The optimal sensor combination calculator may generate the chromosome based on the data of the sensors by using a receding horizon control method.

The optimal sensor combination calculator may include: a first chromosome defining module configured to generate a first chromosome based on the data of the sensors; a data dividing module configured to divide the data of the sensors into training data and testing data; a temporary model generating module configured to generate a temporary model from the first chromosome; a model suitability calculator configured to train the temporary model with the training data, and apply the testing data to the trained temporary model to determine a model suitability; and a suitability comparing module configured to determine a combination of sensor data, which is used to generate the temporary model, as the optimal sensor combination in response to the determined model suitability satisfying a preset condition.

The system may further include a next-generation chromosome defining module configured to redefine the first chromosome used for the generating the temporary model as a previous-generation chromosome in response to the determined model suitability not satisfying the preset condition, and define a next-generation chromosome by applying crossover and mutation to the previous-generation chromosome. The temporary model generating module may generate a model from the next-generation chromosome, and update the generated model as another temporary model. The model suitability calculator may generate a trained temporary model by training the updated temporary model with the training data, calculate a suitability by applying the testing data to the trained temporary model, and update the determined model suitability, and the suitability comparing unit may determine a combination of sensor data, which is used to generate the updated temporary model, as the optimal sensor combination in response to the updated model suitability satisfying the preset condition.

The first chromosome defining unit may receive information about a variable, which varies according to a type of the temporary model, from the temporary model generating module, and generate the first chromosome from the received information and the data of the sensors.

The temporary model may be generated by using a support vector machine, and the model suitability calculator may calculate the model suitability by applying the testing data converted by an input vector to the trained temporary model.

The first chromosome and the next-generation chromosome may include a kernel function parameter of a support vector machine represented by a binary number.

According to one or more exemplary embodiments, there is provided a method of establishing a facility abnormality prediction model which may include: receiving data of sensors of a facility previously obtained during an operation of the facility; predicting a malfunction time of a malfunction of the facility based on the data of the sensors, and determining an abnormality notification time for pre-notification of the malfunction of the facility based on the detected malfunction time; generating a chromosome based on the data of the sensors, and performing a genetic algorithm using the generated chromosome to calculate an optimal sensor combination which is a combination of sensor data related to the determined abnormality notification time; and generating a facility abnormality prediction model to be used for the pre-notification of the malfunction of the facility, based on the optimal sensor combination.

The receiving the data of the sensors may include: receiving production data, which is a numerical representation of facility products which are produced whenever an operational cycle of the facility is completed, and the data of the sensors; and synchronizing the production data with the data of the sensors based on information about time points when the production data and the data of the sensors are obtained.

The determining the abnormality notification time may include predicting the malfunction time of the malfunction of the facility based on the data of the sensors considering an accumulated numerical value of defective facility products among the facility products which are produced whenever an operational cycle of the facility is completed.

The calculating the optimal sensor combination may include generating the chromosome based on the data of the sensors by a receding horizon control method.

The calculating the optimal sensor combination may include: generating a first chromosome from the data of the sensors; dividing the data of the sensors into training data and testing data; generating a temporary model from the first chromosome; training the temporary model with the training data, and applying the testing data to the trained temporary model to determine a model suitability; and determining a combination of sensor data, which is used to generate the temporary model, as the optimal sensor combination in response to the determined model suitability satisfying a preset condition.

The method may further include redefining the first chromosome used for the generating the temporary model as a previous-generation chromosome in response to the determined model suitability not satisfying the preset condition, and defining a next-generation chromosome by applying crossover and mutation to the previous-generation chromosome. The generating the temporary model may include generating a model from the next-generation chromosome, and updating the generated model as another temporary model. The training and the applying may include generating a trained temporary model by training the updated temporary model with the training data, calculating a suitability by applying the testing data to the trained temporary model, and updating the determined model suitability. The determining the combination of sensor data may include determining a combination of sensor data, which is used to generate the updated temporary model, as the optimal sensor combination in response to the updated model suitability satisfying the preset condition.

The generating the first chromosome may include receiving information about a variable, which varies according to a type of the temporary model, and generating the first chromosome from the received information and the data of the sensors.

The temporary model may be generated by using a support vector machine, and the training and applying may include calculating the model suitability by applying the testing data converted by an input vector to the trained temporary model.

The first chromosome and the next-generation chromosome may include a kernel function parameter of a support vector machine represented by a binary number.

According to one or more exemplary embodiments, a non-transitory computer-readable recording medium stores a program that performs the above method when executed by a computer.

BRIEF DESCRIPTION OF THE DRAWINGS

These and/or other aspects will become apparent and more readily appreciated from the following description of the embodiments, taken in conjunction with the accompanying drawings, in which:

FIG. 7 is a diagram illustrating a first chromosome that is transmitted to a model generator when a temporary model is established through a support vector machine, according to an exemplary embodiment;

DETAILED DESCRIPTION OF THE EXEMPLARY EMBODIMENTS

Figure 1:
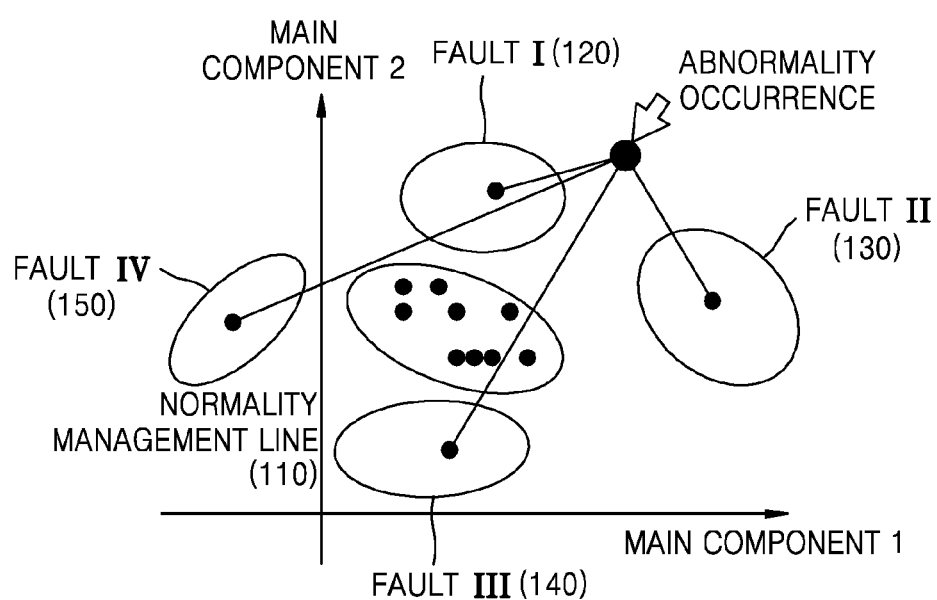
FIG. 1 is a schematic diagram illustrating a related art method for statistically finding a relationship between a facility abnormality and facility data having a clear linearity.

Reference will now be made in detail to exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the following description, detailed descriptions of well-known functions or configurations will be omitted since they would unnecessarily obscure the subject matters of the exemplary embodiments. It will also be understood that the terms "comprises", "includes", and "has" used herein specify the presence of stated elements, but do not preclude the presence or addition of other elements, unless otherwise defined.

FIG. 1 is a schematic diagram illustrating a related art method of statistically finding a relationship between a facility abnormality and facility data having a clear linearity.

FIG. 1 schematically illustrates the occurrence of facility abnormality by facility data FAULT I to IV 120, 130, 140 and 150 deviating from a normality management line 110.

The inventive concept may use a classification model as a method of finding the correlation between facility data and facility abnormality. In detail, the classification model may include a classification standard for classifying facility data and facility abnormality so as to clearly show the correlation between facility data and facility abnormality. According to the performance of the classification standard included in the classification model, near random classification may be performed or the facility data and the facility abnormality may be classified to clearly show the correlation between the facility data and the facility abnormality.

The classification standard may be established by a machine learning algorithm. The machine learning algorithm is one of the algorithms that are implemented in an apparatus to receive and process input data, and then, generate output data. The machine learning algorithm is an algorithm for learning input data in order to output better output data as more operations are performed on the same input data.

That is, an apparatus having the machine learning algorithm calculates output data corresponding to input data by performing a learning operation based on previous input data. Therefore, the machine learning algorithm may be used as a method of predicting next output data corresponding to next input data when pervious input data and previous output data are abundant but the correlation between input data and output data is not completely secured.

Examples of the machine learning algorithm include a K-nearest neighbors algorithm, perceptron, a radial basis function network, a genetic algorithm, and a support vector machine.

The inventive concept proposes establishing a facility abnormality prediction model through one or more of the above machine learning algorithms. In the inventive concept, the facility abnormality prediction model refers to a model for diagnosing facility abnormality by receiving an input of facility data.

According to an exemplary embodiment, the facility abnormality prediction model may be established by using both the genetic algorithm and the support vector machine among the above machine learning algorithms.

The genetic algorithm is a kind of machine learning algorithm. The genetic algorithm is performed by evolving according to surrounding environments as a motivation from the evolution theory of Darwin, and is based on one or more times of repetition operations.

The genetic algorithm is performed by repeating a process of selecting a plurality of chromosomes according to one of various selection methods, determining how excellent each chromosome is, and then leaving only excellent chromosomes. A left excellent chromosome may be multiplied through crossover and mutation, and the above process is repeated until a chromosome exceeds a preset standard. This will be described later in detail with reference to FIG. 5.

The support vector machine is a method of predicting new data by computer-learning a determination method of properly dividing two types of data. The use of the support vector machine has a limitation in providing a satisfactory performance on realistic problems in which causes and effects have nonlinear characteristics. However, the use of a mapping method based on a kernel function enables efficient prediction. Kernel-based mapping provides the effect of solving a complex nonlinear problem in an input space, in which pieces of data are actually arranged, by moving data about a nonlinear problem, which is difficult to divide well in the input space, into a feature space that is a high-dimensional space and then performing the support vector machine in the feature space.

The use of the support vector machine requires an input parameter used to determine an input vector and a kernel function parameter for use in a kernel function. This will be described later in detail with reference to FIG. 5. Since the above support vector machine is well known in the art, general descriptions thereof, which are irrelevant to the inventive concept, will be omitted for conciseness.

Figure 2:
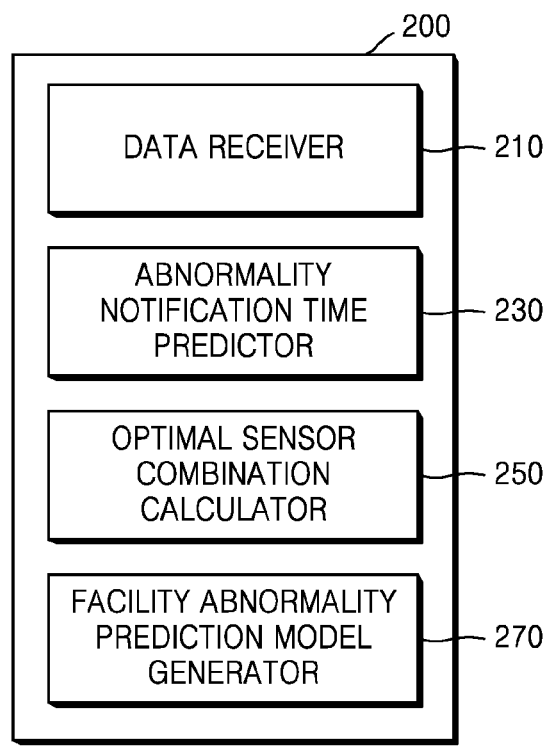
FIG. 2 is a block diagram of a facility abnormality prediction model establishing system, according to an exemplary embodiment.

FIG. 2 is a block diagram of a facility abnormality prediction model establishing system 200, according to an exemplary embodiment.

Referring to FIG. 2, the facility abnormality prediction model establishing system 200 according to an exemplary embodiment includes a data receiver 210, an abnormality notification time predictor 230, an optimal sensor combination calculator 250, and a facility abnormality prediction model generator 270.

The data receiver 210 receives data of sensors of a facility. The data may have been previously obtained during an operation of the facility. The sensors of the facility may include sensors which are disposed at, attached to or connected to the facility in a wired or wireless manner not being limited thereto. The data of sensors may include data obtained by the sensors, and these sensors may obtain the data by generating, detecting, reading, collecting, measuring or calculating the data, not being limited thereto.

In general, a plurality of sensors indicating an operation state of a facility may be disposed at the facility, and data obtained by the sensors may be an important factor for predicting facility abnormality and determining a maintenance time of the facility.

The sensor data received by the data receiver 210 may include state information about a unit or module for performing an operation in the facility or for the facility. Since the state information about the unit or module for performing the operation process may be obtained through at least one sensor disposed at the unit or module, the sensor data of the facility may also be referred to as trace data of the facility.

The data of each of the sensors may be obtained according to a predetermined interval set for each sensor, and the predetermined intervals of all sensors disposed at the facility may differ.

According to an exemplary embodiment, the sensor data may be sensor data of a surface mounter. The sensor data of the surface mounter may include vacuum pressure, blow pressure, offset, temperature, illumination, and the amount of use of a central processing unit (CPU) of the surface mounter.

After receiving data of the sensors of the facility, the data receiver 210 transmits the received sensor data to the abnormality notification time predictor 230.

The abnormality notification time predictor 230 determines or predicts a malfunction time of the facility based on the sensor data, and determines an abnormality notification time for pre-notification of the malfunction of the facility based on the predicted malfunction time.

The malfunction time refers to a time when the facility malfunctions or is expected to malfunction. The abnormality notification time predictor 230 may store an allowable standard (or tolerance) for each sensor data in order to determine or predict the malfunction time of the facility based on the data of the sensors. For example, the abnormality notification time predictor 230 may determine a time, at which a temperature exceeding the allowable standard is measured by a temperature sensor disposed at the facility, as the malfunction time.

The abnormality notification time refers to a time that is most suitable or desirable for notifying a possibility of immediate or imminent occurrence of a malfunction to a facility manager before the malfunction occurs in the facility. That is, the abnormality notification time is earlier than the malfunction time of the facility. Both the malfunction time and the abnormality notification time may be represented by time information, and may be represented not only on a general time basis but also on a facility cycle basis.

A time difference between the malfunction time and the abnormality notification time may be determined as a preset time. The preset value may be a sufficient time that is required to take an action for preventing the malfunction of the facility at the malfunction time based on the malfunction notification to the facility manager at the abnormality notification time.

That is, the abnormality notification time predictor 230 may determine or predict the malfunction time according to the allowable standard set for each sensor from the data of the sensors, and then, determine the time, that is earlier than the detected malfunction time by the preset time, as the abnormality notification time.

The optimal sensor combination calculator 250 generates at least one chromosome from the data of the sensors, and performs a genetic algorithm using the generated chromosome to calculate an optimal sensor combination that is a combination of sensor data related to the abnormality notification time determined by the abnormality notification time predictor 230.

The chromosome refers to at least one variable that is necessary to perform the genetic algorithm. The chromosome generated by the optimal sensor combination calculator 250 may reflect all of the data of the sensors received at the data receiver 210.

First, the optimal sensor combination calculator 250 may generate at least one chromosome from the data of the sensors. The chromosome generated from the data of the sensors may be referred to as at least one first chromosome or at least one first-generation chromosome, and may reflect all of the data of the sensors that is received by the data receiver 210.

The optimal sensor combination calculator 250 may perform a genetic algorithm using the first chromosome to select only sensor data related to the malfunction of the facility among the data of the sensors. In general, the data of the sensors that is received by the data receiver 210 does not have a linear correlation with the malfunction of the facility. That is, all the data of the sensors of the facility may not be data that is necessary to determine or predict the malfunction of the facility.

There may be sensor data that is always related to the malfunction of the facility, and also, there may be sensor data that is related to the malfunction of the facility only when other sensor data have specific numerical values.

The data of the sensors may be data of a previous time and include sufficient sensor data before facility abnormality occurs. Therefore, the optimal sensor combination calculator 250 may generate a first chromosome based on the data of the sensors, and perform a genetic algorithm through the first chromosome to select only sensor data related to the malfunction of the facility.

The optimal sensor combination calculator 250 may generate next-generation chromosomes repeatedly by performing crossover and mutation from the first chromosome, repeat by a predetermined number of times a process of numerically determining whether the malfunction of the facility may be described well by the sensor data based on the generated next-generation chromosome, and then calculate the optimal sensor combination that is a combination of sensor data related to the abnormality notification time. The optimal sensor combination calculator 250 may perform both a process of generating a chromosome from sensor data and a process of dividing sensor data reflected in the chromosome.

The predetermined number of times may be a sufficiently large number of times so that that the optimal sensor combination calculator 250 may calculate a sensor data combination that is more reasonable than the data of the sensors that is received by the data receiver 210 from the first chromosome. A sensor data combination is calculated by the optimal sensor combination calculator 250 and is not limited to sensor data that is most related to the facility abnormality. When the data of the sensors are data of a case where a facility malfunction occurs two or more times, there may be two or more optimal sensor combinations that may describe the facility malfunction.

The facility abnormality prediction model generator 270 generates a facility abnormality prediction model which notifies a malfunction or a possible malfunction of the facility in advance by determining or predicting the malfunction time of the facility, based on the optimal sensor combination calculated by the optimal sensor combination calculator 250.

The facility abnormality prediction model refers to a model for receiving the data of the sensors of the facility in real time, predicting a facility malfunction, and pre-notifying the facility malfunction before the facility malfunction occurs. Since the facility abnormality prediction model generated according to the present exemplary embodiment is optimized by previous facility data, the notification of immediate or imminent occurrence of a facility malfunction may be provided to the facility manager before the facility malfunction occurs by detecting a change of facility sensor data input in real time in view of previous facility sensor data. That is, the facility abnormality prediction model generated by the facility abnormality prediction model generator 270 may use the facility sensor data as input data to output the abnormality notification time of the facility.

The facility abnormality prediction model may be generated by any one of the above machine learning algorithms.

For example, the facility abnormality prediction model may be generated by the support vector machine. The facility abnormality prediction model generated by the support vector machine may receive the facility sensor data in the form of an input vector. The facility abnormality prediction model generated by the support vector machine may include a hyperplane for classifying the facility sensor data into sensor data related to the facility abnormality and sensor data irrelevant to the facility abnormality. Finally, the facility abnormality prediction model may determine an abnormality notification time with respect to newly-input facility sensor data based on the sensor data related to the facility abnormality that is classified by the hyperplane.

Figure 3:
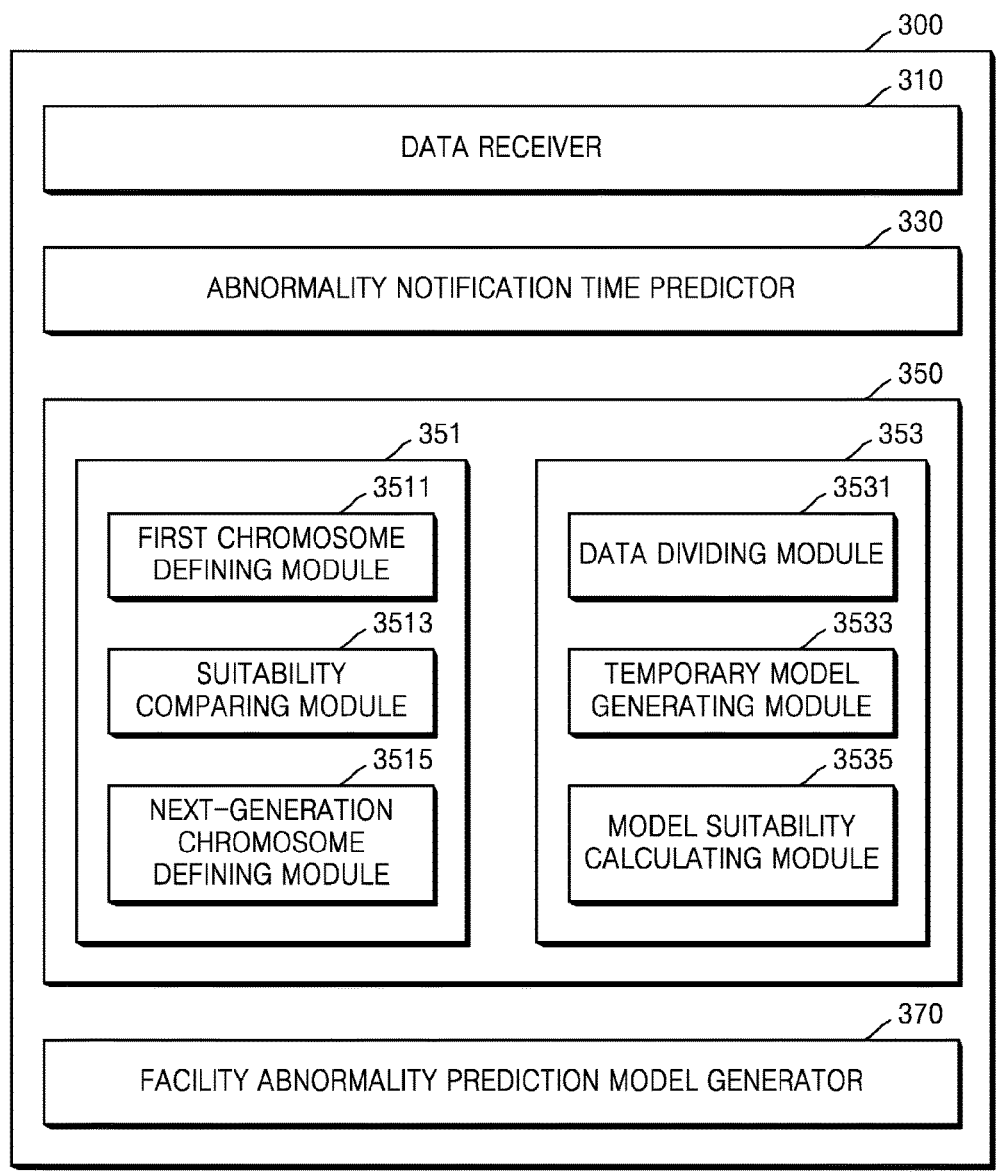
FIG. 3 is a block diagram of a facility abnormality prediction model establishing system, according to another exemplary embodiment.

FIG. 3 is a block diagram of a facility abnormality prediction model generating system 300, according to another exemplary embodiment.

Referring to FIG. 3, the facility abnormality prediction model generation system 300 according to another exemplary embodiment includes a data receiver 310, an abnormality notification time predictor 330, an optimal sensor combination calculator 350, and a facility abnormality prediction model generator 370.

Redundant descriptions of the same elements as those of the embodiment of FIG. 2 are omitted for conciseness.

The data receiver 310 receives data of sensors of a facility. The data of sensors may have been previously obtained during one or more operations of the facility.

According to an exemplary embodiment, the data receiver 310 may receive production data, which is a numerical representation of facility products that are produced whenever an operational cycle of the facility is completed, and data of the sensors, and synchronize the production data with the data of the sensors based on information about time points when the production data and the data of the sensors are obtained.

The production data received by the data receiver 310 refers to data indicating how many products are produced at the facility. The products are products of the facility that are directly related to the purpose of the facility, and refer to visible products that are produced when one cycle of the facility is completed. For example, when the facility is an electric generator, the products of the facility may be electricity.

According to an exemplary embodiment, the production data may be data obtained during an operation of the surface mounter. In this case, the production data of the surface mounter may include the number of times of normally picking up a board such as a printed circuit board (PCB), the number of times of failing to pick up the board, and the number of times of determining that the board has been normally picked up even when having failed to pick up the board.

The production data of the surface mounter may include data irrelevant to time and data relevant to time. The data irrelevant to time among the production data of the surface mounter may include data with respect to each board, a slot, a nozzle, and a head of the surface mounter. The data relevant to time among the production data of the surface mounter may include a time period required for a cycle of an operation of the surface mounter.

Figure 4:
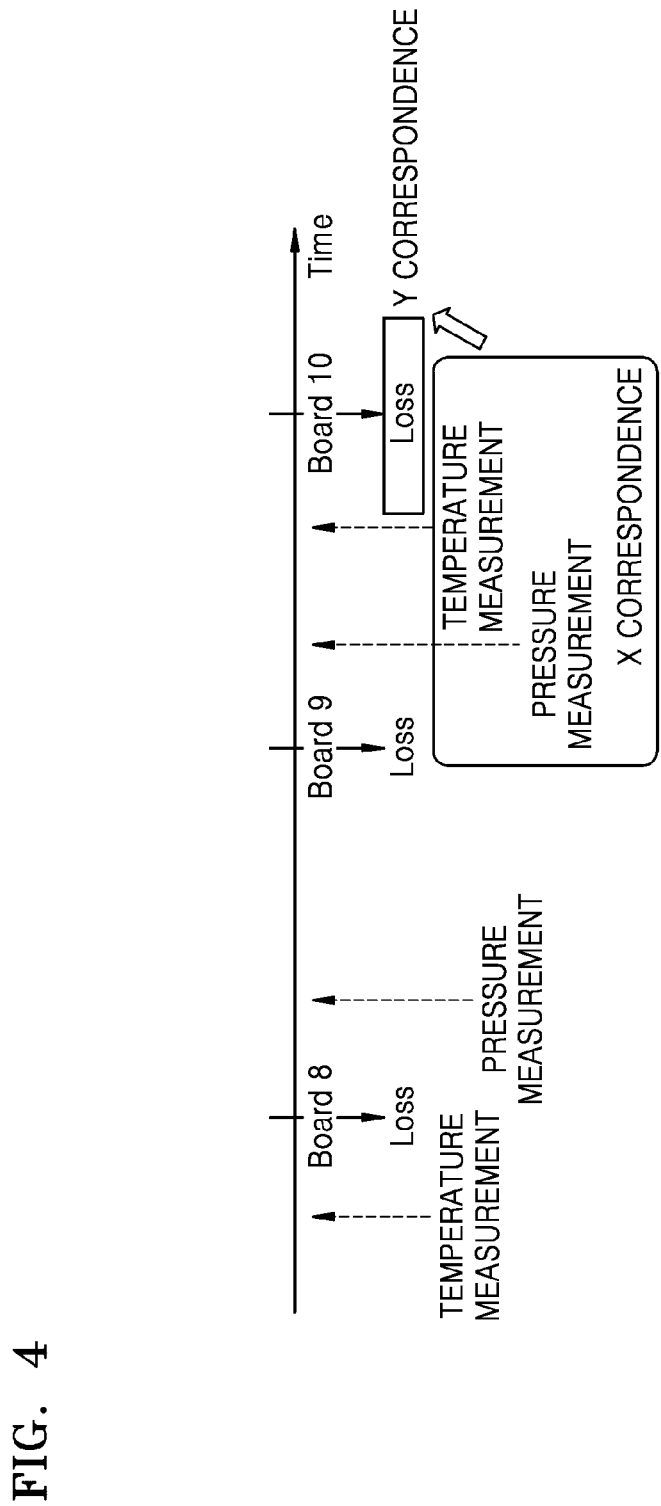
FIG. 4 is a diagram illustrating a process of synchronizing production data with data of sensors in a data receiving unit, according to an exemplary embodiment.

FIG. 4 is a diagram illustrating a process of synchronizing production data with data of sensors in a data receiver.

Referring to FIG. 4, it may be seen that a facility generating production data and data of sensors is a surface mounter. The production data and data of sensors may also be synchronized with each other.

Referring to FIG. 4, a temperature measurement occurs immediately before discarding a board 8, a pressure measurement occurs immediately before discarding a board 9, and measurement of both a temperature and a pressure occurs immediately before discarding a board 10. The boards 8-10 may be discarded because of a board production problem or malfunction. Since a time point when a board is discarded and a time for measuring or detecting facility state information (e.g., temperature or pressure) are different from each other, it may be necessary to synchronize production data of the board discard time with sensor data that is most recently measured with respect the board discard time.

That is, in FIG. 4, the temperature and pressure data measured immediately before discarding the board 10 is synchronized with the production data of the discard time of the board 10.

As an exemplary embodiment in which the data receiver 310 synchronizes the production data with the data of the sensors, the data receiver 310 may synchronize the production data and the data of the sensors based on comparison between time information about obtaining the production data and the time information about obtaining the data of the sensors.

For example, when production data B is obtained earlier than a time point of measuring or detecting sensor data A, the data receiver 310 may determine that the sensor data A and the production data B may not be synchronized, based on the time information about the production data B and the sensor data A. As another example, when production data D is obtained immediately after measuring sensor data C, the data receiver 310 may synchronize the sensor data C with the production data D.

The production data and the data of the sensors, which are synchronized by the data receiver 310, are transmitted to the abnormality notification time predictor 330.

The abnormality notification time predictor 330 determines or predicts a malfunction time of the facility from the data of the sensors and determines an abnormality notification time for pre-notification of the malfunction of the facility based on the determined or predicted malfunction time.

As an exemplary embodiment, the abnormality notification time predictor 330 may set a response variable. The response variable is a numerical representation of facility abnormality and may be represented by a binary number. As an example of the response variable, the abnormality notification time predictor 330 may set a response variable indicating the facility abnormality based on a change in an accumulated loss rate. The accumulated loss rate and a change in the accumulated loss rate will be described later in detail with reference to FIG. 5.

After the abnormality notification time predictor 330 sets the response variable, the abnormality notification time predictor 330 may transmit the response variable and synchronized data (the production data and data of the sensors) to the optimal sensor combination calculator 350. For conciseness of description, complete facility data described later will refer to the synchronized production data and the data of the sensors together with the response variable.

Figure 5:
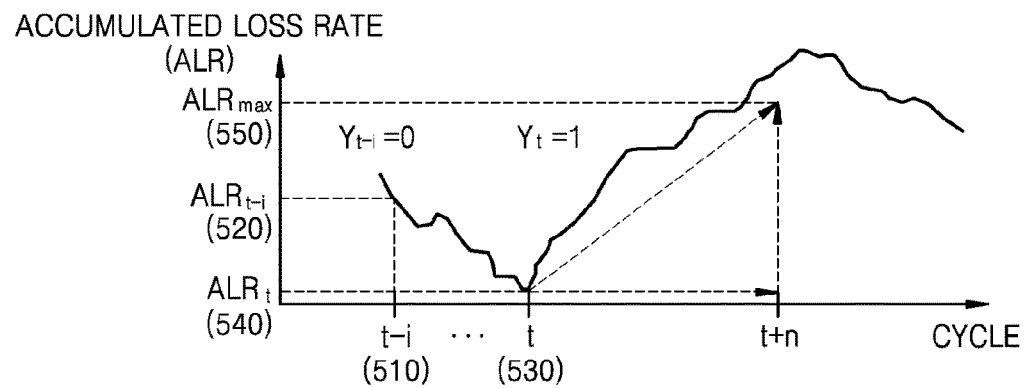
FIG. 5 is a diagram illustrating an accumulated loss rate, according to an exemplary embodiment.

FIG. 5 is a diagram illustrating an accumulated loss rate, according to an exemplary embodiment.

The accumulated loss rate refers to a rate at which accumulation of abnormal facility products produced according to an operation of a facility is measured at predetermined intervals. For example, when a defective board is produced due to a facility abnormality in a surface mounter, the defective board is discarded. In this case, the accumulated loss rate increases as the number of discarded boards per unit time increases. The unit time may be not only a general time unit (e.g., hours, minutes, or seconds) but also a cycle in which the facility produces a predetermined number of facility products.

That is, the accumulated loss rate may be determined by production data and information about a calculation time of the production data by the facility. If there is a sensor for calculating an accumulated loss rate per cycle of the facility with reference to a timer and the production data, the accumulated loss rate may be classified as sensor data included in the data of the sensors.

A change of the accumulated loss rate refers to a degree by which the accumulated loss rate changes with time. The change of the accumulated loss rate may be a standard indicating a facility malfunction because the accumulated loss rate changes in a predetermined pattern immediately before occurrence of the facility malfunction. For example, when it is detected from the data of the sensors that the accumulated loss rate rapidly decreases or increases before the occurrence of the facility malfunction, the change of the rapidly-increasing/decreasing accumulated loss rate may indicate an abnormality notification time for notification of the facility malfunction.

The abnormality notification time predictor 330 may determines a proper time for the abnormality notification time from the change of the accumulated loss rate, and the detected abnormality notification time may be a point having a response variable of 1 and the others may be points having a response variable of 0.

Referring to FIG. 5, an accumulated loss rate 520 measured in $(t-i)^{th}$ cycle 510 is higher than an accumulated loss rate 540 measured in a $(t)^{th}$ cycle 530. A plurality of facility products may be output in each cycle, and defective products to be discarded may be included in the plurality of facility products.

Referring to FIG. 5, when the cycle is further performed n times in the $(t)^{th}$ cycle 530, an accumulated loss rate 550 exceeding an allowable standard is measured. Therefore, it may be a standard time (abnormality notification time) at which the facility abnormality is determined in the $(t)^{th}$ cycle 530 in the present exemplary embodiment, and the $(t)^{th}$ cycle 530 may be a point having a response variable of 1.

That is, since a time at which the facility abnormality exceeding the available standard occurs is predicted by taking into account previous data, although the accumulated loss rate 540 measured in the $(t)^{th}$ cycle 530 is lowest among peripheral values, a time of the $(t)^{th}$ cycle 530 may be the time at which a facility abnormality prediction model predicts and notifies a facility manager of a facility abnormality.

The complete facility data may include not only data about a previous normal operation time of the facility and data about a time at which facility abnormality occurs but also data about a time at which the facility abnormality is expected to occur. That is, as illustrated in FIG. 5, the change of the previous data is patterned and used to predict the facility abnormality more accurately.

The response variable set by the abnormality notification time predictor 330 is related to the facility abnormality. Since the response variable may have a value calculated by the synchronized production data and the data of the sensors, it may be data other than the accumulated loss rate according to the facility type.

The abnormality notification time predictor 330 transmits the complete facility data to the optimal sensor combination calculator 350.

The optimal sensor combination calculator 350 generates at least one chromosome from the data of the sensors and performs a genetic algorithm using the generated chromosome to calculate an optimal sensor combination that is a combination of sensor data related to the abnormality notification time determined by the abnormality notification time predictor 330. The optimal sensor combination calculator 350 may include a model generation preparing processor 351 and a model generator 353.

The model generation preparing processor 351 defines a chromosome for performing a genetic algorithm and receives a model suitability and a temporary model generated by the model generator 353. The model generation preparing processor 351 may include a first chromosome defining module 3511, a suitability comparing module 3513, and a next-generation chromosome defining module 3515.

The first chromosome defining module 3511 defines a first chromosome that is a variable for generating the temporary model that is experimentally generated to generate a facility abnormality prediction model. The first chromosome may be defined from complete facility data and may include a generation variable for generating the temporary model. The first chromosome may include one or more generation variables of the temporary model.

The generation variable included in the first chromosome to generate the temporary model may be data of a binary representation of sensor data included in the complete facility data. According to an exemplary embodiment, when the temporary model is generated by using a support vector machine, the generation variable included in the first chromosome may further include a kernel function parameter in addition to the data of the sensors. The kernel function parameter will be described later in detail with reference to FIG. 7.

Figure 6:
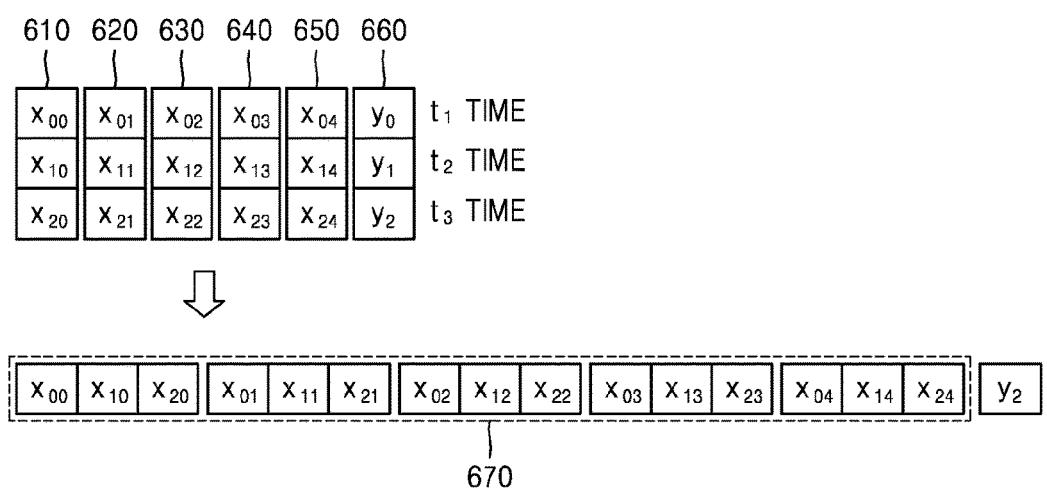
FIG. 6 is a schematic diagram illustrating a process of generating a first chromosome from complete facility data, according to an exemplary embodiment.

FIG. 6 is a schematic diagram illustrating a process of generating the first chromosome from the complete facility data.

Referring to FIG. 6, the complete facility data includes response variables 610, 620, 630, 640, 650 and 660 and data of sensors from a t1 cycle time to a t3 cycle time. In FIG. 6, data of five sensors may be referred to input variables corresponding to the response variables. Also, the number of sensors may vary depending on exemplary embodiments, and the input variable and the response variable may be represented by binary numbers.

For convenience of description, if only y2 is 1 and y0 and y1 are 0, the response variables 610, 620, 630, 640, 650 and 660 and the data of the sensors from the t1 cycle time to the t3 cycle time may be interpreted as follows. That is, when first sensor data changes from x00 to x20, second sensor data changes from x01 to x21, third sensor data changes from x02 to x22, fourth sensor data changes from x03 to x23, fifth sensor data changes from x04 to x24 from the t1 cycle time to the t3 cycle time, if the response variable is 0 from the t1 cycle time to the t2 cycle time, the response variable may be 1 at the t3 cycle time. In the above example, like the response variables, the data of the sensors may also be represented by binary numbers.

The first chromosome defining module 3511 may define the response variables 610, 620, 630, 640, 650 and 660 and the data of the sensors by a receding horizon control method. Herein, the receding horizon control method arranges a plurality of sensor data, which are measured at different times, into one data by disposing the sensor data in a time order.

Referring to FIG. 6, it may be seen that a first chromosome 670 is generated by arranging the data of the sensors from the t1 cycle time to the t3 cycle time in a time order by using the receding horizon control method.

Referring to FIG. 6, five input variables may be defined in the first chromosome 670, and the five input variables may be randomly selected from various data such as temperature, pressure, vision, illumination, an amount of use of the CPU in a specific module constituting the facility as described above.

According to an exemplary embodiment, the input variable defined in the first chromosome may be represented by a binary number indicating whether to select the input variable. In this case, it may be determined whether to select the input variable according to the value of the corresponding binary number. For example, as illustrated in FIG. 5, it is assumed that five input variables are defined in the first chromosome and each input variable is represented by a 1-digit binary number. In the above example, when a binary sequence corresponding to the input variables are represented by 11001, the first, second, and third input variables are selected from among the five input variables.

According to an exemplary embodiment, when the genetic algorithm is repeatedly performed, the first chromosome may be defined, and also a next-generation chromosome may be defined based on the first chromosome. In order to generate the temporary model, both the first chromosome and the next-generation chromosome may be represented by a combination of various input variables. According to an exemplary embodiment, the input variable combination capable of describing the facility abnormality may be determined by the genetic algorithm and the previous data of various times may be represented by one chromosome by using the receding horizon control method. Therefore, unlike the related art genetic algorithm, a predetermined number or more previous chromosomes (first chromosomes) may not be reproduced in order to define the next-generation chromosome. The next-generation chromosome will be described later in detail together with the description of the next-generation chromosome defining module 3515.

The first chromosome defining module 3511 defines the chromosome generated from the complete facility data as the first chromosome, and then, transmits the first chromosome to the model generator 353.

FIG. 7 is a diagram illustrating the first chromosome that is transmitted to the model generator 353 when the temporary model is generated through the support vector machine according to an exemplary embodiment.

The first chromosome illustrated in FIG. 7 is represented by a binary number in order to perform a support vector machine process on a computer.

Referring to FIG. 7, the first chromosome includes a plurality of binary numbers indicating whether to select an input variable, and a kernel function parameter for generating the temporary model through the support vector machine. The kernel function parameter included in the first chromosome of FIG. 7 may be represented as a radial basis function (RBF) parameter by two types of values according to characteristics thereof.

As illustrated in FIG. 7, in order to apply nonlinear data to the support vector machine, mapping based on a kernel function is necessary as described above, and the kernel function parameter may be additionally defined in the first chromosome for the mapping. The kernel function parameter may also be represented by a binary number, and it converges to an optimal value according to performance of the genetic algorithm.

According to another exemplary embodiment, when the model generator 353 generates the temporary model by methods other than the support vector machine method, the first chromosome may not include the kernel function parameter or may include information other than the kernel function parameter according to the temporary model generation methods. Therefore, according to an exemplary embodiment, the first chromosome defining module 3511 may receive information about a variable, which varies depending on temporary model types, from a temporary model generating module 3533 before defining the first chromosome, and generate the first chromosome from the received information and the data of the sensors.

The first chromosome is defined by the first chromosome defining module 3511, and then, transmitted to the model generator 353. When the first chromosome is transmitted to the model generator 353, the complete facility data may also be transmitted together with the first chromosome. When the temporary model is generated by the model generator 353, the complete facility data may be used to determine the model suitability of the temporary model.

The model suitability refers to a numerical value indicating how well the temporary model generated by the model generator 353 actually predicts facility abnormality.

The suitability comparing module 3513 determines whether to further perform the genetic algorithm, by comparing the model suitability received from the model generator 353 with a prestored standard suitability. In detail, the suitability comparing module 3513 determines a combination of sensor data, which is used to generate the temporary model, as an optimal sensor combination when the model suitability of the temporary model satisfies a preset condition.

Herein, the preset condition refers to a condition that is preset by the suitability comparing module 3513, and there is the standard suitability as an example of the preset condition. The standard suitability is stored in the suitability comparing module 3513 and then compared with the model suitability. When the model suitability is equal to or higher than the standard suitability, the suitability comparing module 3513 calculates the optimal sensor combination from the chromosome used to generate the temporary model for the model suitability.

As an exemplary embodiment of the preset condition, the suitability comparing module 3513 may detect the number of times of a next-generation chromosome being repeatedly defined by the genetic algorithm, and determine the temporary model corresponding to the highest model suitability among the determined model suitabilities as the facility abnormality prediction model when the detected number of times reaches a preset number of times. For example, when the next-generation chromosome is defined repeatedly by 999 times, 1000 temporary models may be generated and then transmitted to the model generation preparing processor 351. In this case, the suitability comparing module 3513 may determine the temporary model corresponding to the highest model suitability as the facility abnormality prediction model.

According to this exemplary embodiment, the model generator 353 may not transmit the temporary model and the model suitability of the temporary model to the suitability comparing module 3513 whenever the temporary model is generated. In this case, the model generator 353 may transmit the temporary model corresponding to the model suitability to the suitability comparing module 3513 while storing only one model suitability by comparing each newly-calculated model suitability with the highest model suitability among the previous model suitabilities and updating the model suitability. In this exemplary embodiment, the suitability comparing module 3513 may check the number of times of repeated defining of the next-generation chromosome by the genetic algorithm and determine the temporary model corresponding to the highest model suitability as the facility abnormality prediction model.

Also in this exemplary embodiment, the suitability comparing module 3513 may further perform a process of comparing the model suitability with the standard suitability. Since the suitability comparing module 3513 operates repeatedly in connection with a suitability-related configuration included in the model generator 353, additional descriptions of the suitability comparing module 3513 will be described later together with the description of FIG. 8.

When the suitability comparing module 3513 determines that the model suitability is lower than the standard suitability, the next-generation chromosome defining module 3515 redefines a currently-defined chromosome as a previous-generation chromosome and defines a chromosome generated based on the previous-generation chromosome as a next-generation chromosome. The next-generation chromosome defining module 3515 may calculate the next-generation chromosome by applying crossover and mutation to the previous-generation chromosome according to a preset rate.

According to an exemplary embodiment, the chromosome is defined by the receding horizon control method, and then, applied to the genetic algorithm. Therefore, unlike in the general genetic algorithm, crossover and mutation of the chromosome occur between the input variables constituting the chromosome, and the previous-generation chromosome may not be reproduced in plurality in order to define the next-generation chromosome.

The next-generation chromosome becomes the current chromosome instead of the previous-generation chromosome, and particularly becomes a variable for generating a new temporary model. A crossover method applied to the previous-generation chromosome may be performed by a preset method such as a 1-point crossover or a 2-point crossover. Also, the probability of a mutation applied to the previous-generation chromosome may be a specific value such as 0.01% or 0.001%.

Since the next-generation chromosome defining module 3515 operates repeatedly in connection with the configuration included in the model generator 353, additional descriptions of the next-generation chromosome defining module 3515 will be described later together with the description of a model suitability calculating module 3535.

The model generator 353 generates and verifies the temporary model. The model generator 353 may include a data dividing module 3531, the temporary model generating module 3533, and the model suitability calculating module 3535.

The data dividing module 3531 receives the complete facility data and divides the complete facility data into training data and testing data. A mode and rate for dividing the complete facility data into the training data and the testing data are not fixed, but the amount of any one of the training data and the testing data may not be 0 for the validity of the repetition process of the genetic algorithm.

The training data may be used to train the temporary model generated by the temporary model generating module 3533. The testing data may be input to the temporary model that is completely trained with the training data. The training data and the testing data are included in the complete facility data, and do not share specific data with each other. The training data and the testing data may be classified according to a preset standard, and the amount of the training data and the amount of the testing data may be identical to each other.

The temporary model generating module 3533 generates a temporary model by using the first chromosome or the next-generation chromosome received from the model generation preparing processor 351, and trains the temporary model to reflect all of the training data of the data dividing module 3531.

In this case, when the chromosome received from the model generation preparing processor 351 is the next-generation chromosome, the temporary model generating module 3533 may update the temporary model generated by the previous-generation chromosome into a temporary model generated by the next-generation chromosome.

The model suitability calculating module 3535 generates a model suitability by applying the testing data to the temporary model received from the temporary model generating module 3533. The temporary model received from the temporary model generating module 3533 may operate completely with respect to the training data. The meaning of the model suitability has already been described in the description of the suitability comparing module 3513.

When the model suitability is high, the facility abnormality may be predicted according to the preset standard with respect to not only the training data but also the testing data.

The model suitability is transmitted to the suitability comparing module 3513 of the model generation preparing processor 351, compared with the standard suitability, and then used as a factor for determining whether the genetic algorithm should be repeated in order to determine the facility abnormality prediction model.

According to an exemplary embodiment, when the maximum number of times of the repetition process of the genetic algorithm is defined instead of the standard suitability in the suitability comparing module 3513, the suitability comparing module 3513 may determine a combination of sensor data, which is used to generate the temporary model having the highest model suitability after reaching the defined maximum number of times, as the optimal sensor combination.

The model suitability calculating module 3535 may compare the levels of consecutively-calculated model suitabilities, update and store only the highest model suitability, and calculate the finally-stored model suitability and a corresponding temporary model when it reaches the maximum number of times of the repetition process of the genetic algorithm.

The model suitability and the standard suitability may be represented by a specific numerical value, and are not necessarily represented by one number. According to an exemplary embodiment, the standard suitability and the model suitability may be represented by values of the coverage and a false positive of the temporary model.

Herein, the false positive refers to a rate representing a degree to which the positive appears although it is not actually positive. The coverage refers to a rate representing a degree to which the temporary model determines the facility abnormality. The numerical values of the false positive and the coverage may vary depending on exemplary embodiments.

For example, it is assumed that there is a temporary model that is set to a false positive of 90% and a coverage of 30% according to an exemplary embodiment. In this exemplary embodiment, when the facility abnormality occurs 100 times, the temporary model should notify the facility manager that the facility abnormality is expected to occur, before the facility abnormality occurs at least 30 or more times, based on the coverage value. Also, when the facility manager directly has examined occurrence/non-occurrence of the facility abnormality according to the facility abnormality prediction notification, the facility abnormality should have occurred at least 27 or more times according to the false positive value.

The temporary model generated by the temporary model generating module 3533 and the model suitability calculated by the model suitability calculating module 3535 may be transmitted to the model generation preparing processor 351. The suitability comparing module 3513 may receive the model suitability transmitted to the model generation preparing processor 351, and compare the received model suitability with the standard suitability. When the model suitability is equal to or higher than the standard suitability, the suitability comparing module 3513 may determine the temporary model transmitted to the model generation preparing processor 351 as the facility abnormality prediction model. The facility abnormality prediction model determined by the suitability comparing module 3513 may predict the facility abnormality to the standard suitability degree or more with respect to the complete facility data including the training data and the testing data.

The facility abnormality prediction model generator 370 generates a facility abnormality prediction model for prediction and pre-notification of the malfunction of the facility based on the optimal sensor combination. The facility abnormality prediction model refers to a model that is generated only by the sensor data related to the malfunction of the facility to receive unknown facility sensor data to notify of the facility abnormality before occurrence of the facility abnormality.

Figure 8:
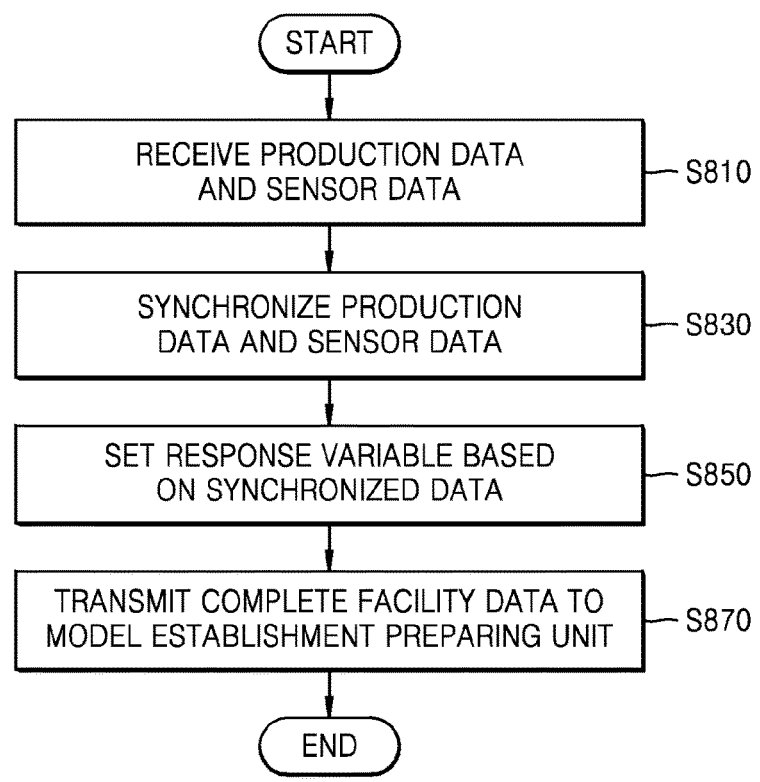
FIG. 8 is a flowchart of a process of completing facility data in a facility abnormality prediction model establishing method, according to an exemplary embodiment.

FIG. 8 is a flowchart of a process of completing facility data in a facility abnormality prediction model generation method, according to an exemplary embodiment.

Referring to FIGS. 2 and 8, the process illustrated in FIG. 8 may be performed by the data receiver 210 included in the facility abnormality prediction model generation system 200, according to an exemplary embodiment.

The data receiver may receive and store production data and data of sensors (S810).

The production data may include data indicating how many facility products are produced by the operation of the facility, and the data of the sensors may include data about state information about a unit or module performing an operation process. For example, when the facility is a surface mounter, the production data may be data about the number of boards produced in a specific cycle period, and the trace data may be data about the pressure or temperature measured at the head, nozzle, slot, or the like of the surface mounter.

The data receiver synchronizes the production data with the data of the sensors (S830).

The data receiver may synchronize the facility products, which are periodically produced by the operation of the facility, and the data, which are obtained by various sensors of the facility, based on the respective time information. In the synchronization process, the data receiver may remove production data having a relationship with the data of the sensors that may not be known at all.

The data receiver sets a response variable based on the synchronized production data and the data of the sensors (S850).

The response variable is a value representing a facility abnormality. In detail, the response variable represents a time for notification of the facility malfunction, and may be set from the synchronized production data and the data of the sensors. A change of an accumulated loss rate is an example of the response variable set by the data receiving unit. The accumulated loss rate may refer to a rate at which accumulation of abnormal facility products produced according to the operation of the facility is measured at predetermined intervals. The change of the accumulated loss rate may refer to a tendency of the change of the accumulated loss rate with time.

The response variable set by the data receiver is related to the facility abnormality. Since the response variable may have a value calculated by the synchronized production data and the data of the sensors, it may also be data other than the accumulated loss rate.

The data receiver transmits the complete facility data to the model generation preparing processor 351 (S870).

The complete facility data refers to data further including the response variable in addition to the synchronized production data and the data of the sensors.

Figure 9:
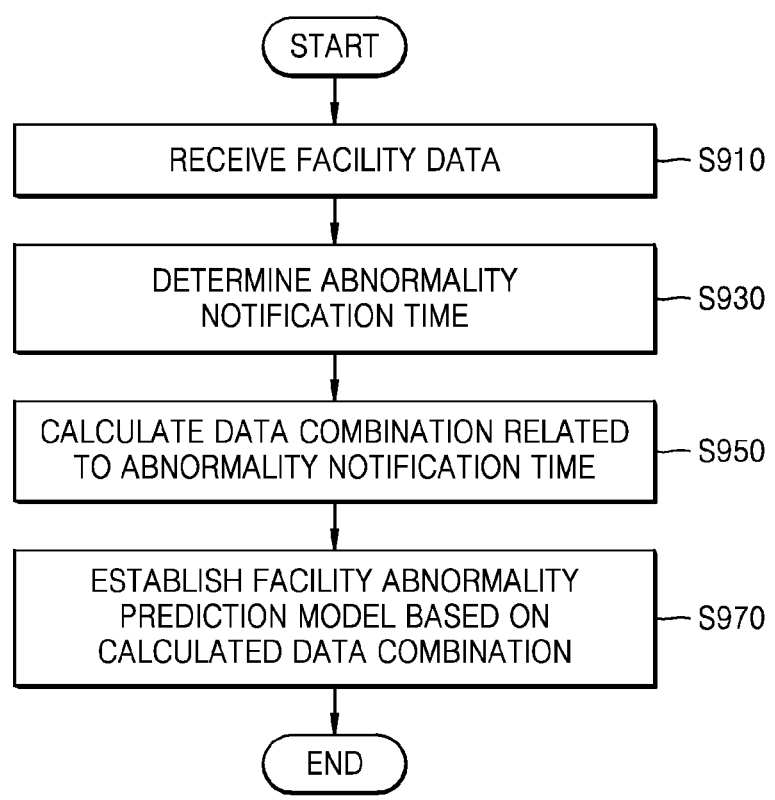
FIG. 9 is a flowchart of a facility abnormality prediction model establishing method, according to an exemplary embodiment.

FIG. 9 is a flowchart of a facility abnormality prediction model generation method according to an exemplary embodiment.

Referring to FIGS. 2 and 9, the method illustrated in FIG. 9 may be performed by the facility abnormality prediction model generation system 200 according to an exemplary embodiment. Thus, redundant descriptions that have already been provided above with reference to FIG. 2 are omitted for conciseness.

The data receiver receives facility data (S910). Herein, the facility data may include production data of the facility and data of sensors of the facility.

The abnormality notification time predictor predicts a malfunction time of a malfunction of the facility from the data of the sensors and determines an abnormality notification time for pre-notification of a malfunction of the facility based on the detected malfunction time (S930).

The optimal sensor combination calculator generates the chromosome from the data of the sensors, and performs a genetic algorithm by a generated chromosome to calculate the optimal sensor combination that is a combination of sensor data related to the abnormality notification time (S950).

The facility abnormality prediction model generator generates a facility abnormality prediction model for prediction and pre-notification of the malfunction of the facility based on the optimal sensor combination (S970).

Figure 10:
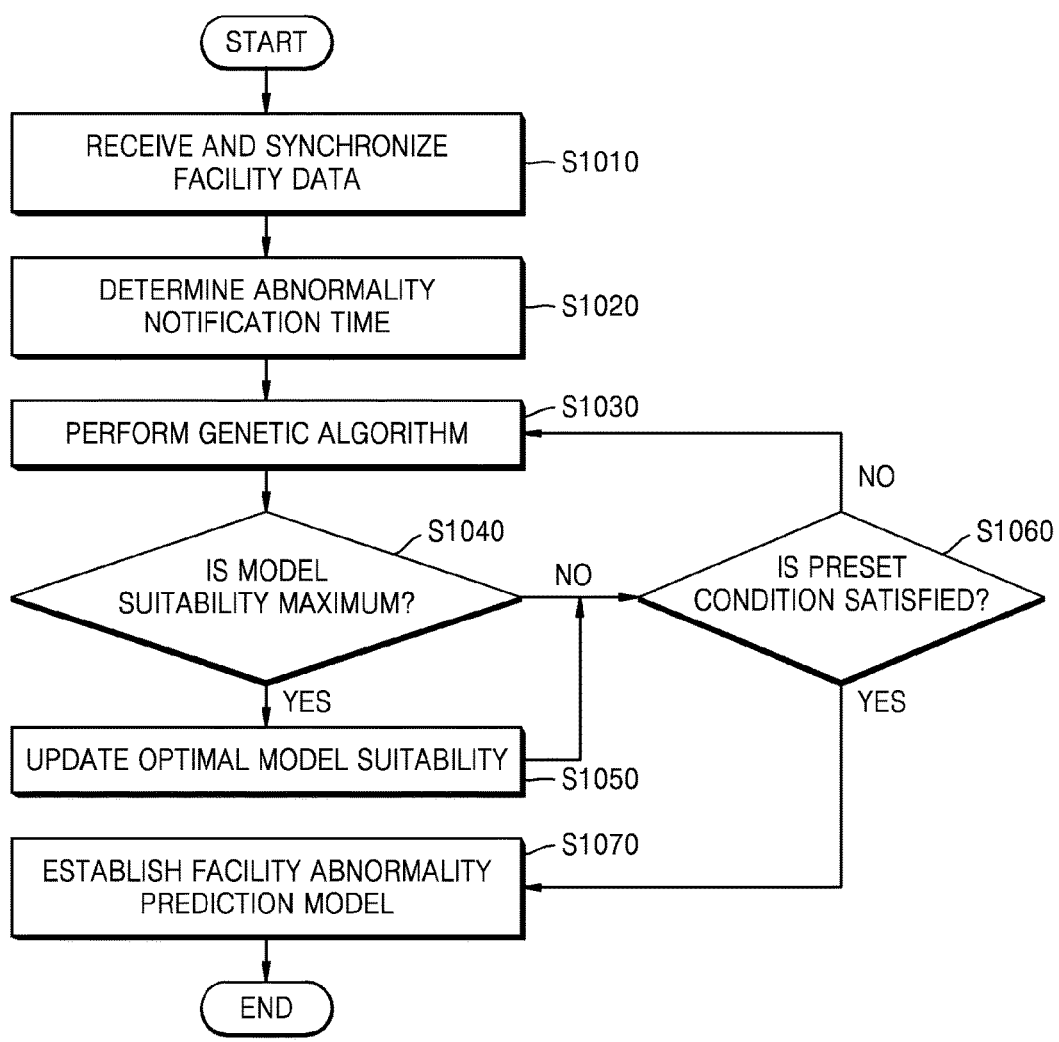
FIG. 10 is a flowchart of a facility abnormality prediction model establishing method, according to another exemplary embodiment.

FIG. 10 is a flowchart of a facility abnormality prediction model generation method, according to another exemplary embodiment.

Referring to FIGS. 3 and 10, the method illustrated in FIG. 10 may be performed by the facility abnormality prediction model generation system 300 illustrated in FIG. 3. Thus, redundant descriptions that have already been provided above with reference to FIG. 3 are omitted for conciseness.

The data receiver receives facility data (S1010). The facility data may include production data of the facility and data of sensors of the facility.

In operation S1010, the data receiver may receive production data, which is a numerical representation of facility products that are finally produced whenever an operational cycle of the facility is completed, together with the data of the sensors, and synchronize the production data with the data of the sensors based on information about time points when the production data and the data of the sensors are obtained.

The abnormality notification time predictor determines or predicts a malfunction time of a malfunction of the facility from the data of the sensors and determines an abnormality notification time for pre-notification of the malfunction of the facility based on the determined or predicted malfunction time (S1020).

In operation S1020, the abnormality notification time predictor may detect the malfunction time of the malfunction of the facility from the data of the sensors based on an accumulated numerical value of defective facility products among facility products that are finally produced whenever an operational cycle of the facility is completed.

The optimal sensor combination calculator performs a genetic algorithm to calculate the optimal sensor combination (S1030).

In operation S1030, the optimal sensor combination calculator may generate a first chromosome from the data of the sensors. The first chromosome is a variable for generating a temporary model that is experimentally generated to determine a facility abnormality prediction model. According to an exemplary embodiment, the first chromosome may include not only the data of the sensors but also information about a variable that varies according to the type of the generated temporary model. In this case, in the first chromosome, not only the data of the sensors but also the variable varying according to the type of the temporary model are optimized through a genetic algorithm. For example, when the temporary model is the model generated through a support vector machine, the first chromosome may further include a kernel function parameter.

In operation S1030, the optimal sensor combination calculator may generate the temporary model from the first chromosome. In operation S1030, the optimal sensor combination calculator may divide the data of the sensors into training data and testing data, and then, train the generated temporary model with the training data. In operation S1030, the optimal sensor combination calculator may determine the model suitability by applying the testing data to the trained temporary model. The model suitability may be represented by at least one value such as a false positive value or a coverage value.

In operation S1030, after the chromosome recently used to generate the temporary model is redefined as the previous-generation chromosome according to a result of operation S1060 described later, crossover and mutation may be applied to the previous-generation chromosome to define a next-generation chromosome. Like the first chromosome, the next-generation chromosome defined in operation S1030 may also be used to generate the temporary model.

According to an exemplary embodiment, the first chromosome and the next-generation chromosome may include a kernel function parameter of the support vector machine that is represented by a binary number. Also, the first chromosome may generate a chromosome from the data of the sensors by using a receding horizon control method. By this method, the data of the sensors at several previous times may be represented by one chromosome. When the genetic algorithm is performed by the chromosome, since crossover and mutation between the input variables input in the chromosome are applied, the chromosome may not be reproduced in order to define the next-generation chromosome, as described with reference to FIG. 7.

The optimal sensor combination calculator determines whether the model suitability of the temporary model calculated in operation S1030 is a maximum (S1040). Herein, the optimal sensor combination calculator stores the model suitability of the previously-generated temporary model, and compares the stored model suitability with the determined model suitability when the model suitability of the newly-generated temporary model is determined.

If the model suitability of the newly-generated temporary model is higher than a prestored model suitability, the optimal sensor combination calculator may update the model suitability of the newly-generated temporary model as the optimal model suitability and store the updated model suitability (S1050).

After determining the model suitability, the optimal sensor combination calculator determines whether the trained temporary model and the model suitability satisfy a condition preset in the optimal sensor combination calculator (S1060).

As an exemplary embodiment of determining whether the trained temporary model and the model suitability satisfy the preset condition, the optimal sensor combination calculator may compare a standard suitability with the model suitability. As another exemplary embodiment of determining whether the trained temporary model and the model suitability satisfy the preset condition, the optimal sensor combination calculator may determine the number of times of repetition by the genetic algorithm, and compare the determined number of times with a preset number of times.

When the preset condition is not satisfied by the trained temporary model and the model suitability, the optimal sensor combination calculator defines the chromosome used to generate the current temporary model as the previous-generation chromosome, and then re-performs the genetic algorithm by defining the next-generation chromosome by applying crossover and mutation to the previous-generation chromosome (returning to operation S1030).

As an example in which the preset condition is not satisfied, the optimal sensor combination calculator may determine that the model suitability is lower than the standard suitability. Also, as another example in which the preset condition is not satisfied, the optimal sensor combination calculator may determine that the number of times of repeated definition of the chromosome by the genetic algorithm is lower than the preset number of times.

If the optimal sensor combination calculator determines in operation S1060 that the preset condition is satisfied by the trained temporary model and the model suitability, the facility abnormality prediction model generator may generate the facility abnormality prediction model for predicting and pre-notifying a malfunction of the facility based on the optimal sensor combination.

In operation S1070, as an example in which the present condition is satisfied, the optimal sensor combination calculator may determine that the model suitability is equal to or higher than the standard suitability.

In operation S1070, as another example in which the present condition is satisfied, the optimal sensor combination calculator may determine that the number of times of repeated definition of the next-generation chromosome by the genetic algorithm reaches the preset number of times. For example, if the first chromosome is the first-generation chromosome, when the finally-defined next-generation chromosome is the $1000^{th}$-generation chromosome, the number of times preset in the optimal sensor combination calculator is 999.

When the model generated according to the exemplary embodiments is used, even when there is a nonlinear relationship between the facility data (e.g., the production data of the facility and the data of the sensors disposed at the facility) and the facility abnormality, since the facility abnormality may be predicted with a high probability from the facility data input in real time to the model, the facility may be easily managed.

In detail, by reading the tendency of the facility data to rapidly determine the facility abnormality, a more significant defect or malfunction of the facility may be prevented and an accident may be prevented. Since the inventive concept is not limited by the above exemplary embodiments and the accompanying drawings, the inventive concept may also be implemented by other machine learning algorithms other than the above support vector machine. While one or more exemplary embodiments have been described with reference to the drawings, it will be understood by those of ordinary skill in the art that various changes in form and details may be made therein without departing from the spirit and scope of the inventive concept as defined by the following claims.

In the above exemplary embodiments, the facility may be equipment, and thus, the data receiver 210 and 310 (FIGS. 2 and 3) may receive data of sensors of the equipment to generate facility abnormality prediction models, according to another exemplary embodiment.

The above exemplary embodiments may be implemented in the form of computer programs that may be executed through various elements on a computer, and the computer programs may be recorded on a computer-readable recording medium. Examples of the computer-readable recording medium include magnetic recording media such as hard disks, floppy disks, and magnetic tapes, optical recording media such as compact discs (CDs) and digital versatile discs (DVDs), magneto-optical recording media such as floptical disks, and hardware devices such as read-only memories (ROMs), random access memories (RAMs), and flash memories that are especially configured to store and execute program instructions. Also, the computer-readable recording medium may include any intangible medium that may be implemented in a transmittable form on a network, and may be, for example, any medium that may be implemented in the form of software or applications to be transmitted and distributed through a network.

The computer programs may be those that are especially designed and configured for the inventive concept, or may be those that are known and available to computer programmers skilled in the art. Examples of the computer programs include machine language codes that may be generated by a compiler, and high-level language codes that may be executed by a computer by using an interpreter.

At least one of the components, elements, modules or units represented by a block as illustrated in FIGS. 2 and 3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a CPU that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like Particular implementations described herein are merely exemplary, and do not limit the scope of the inventive concept in any way. For the sake of conciseness, descriptions of related art electronic configurations, control systems, software, and other functional aspects of the systems may be omitted. Also, the connection lines or connection members between various elements illustrated in the drawings represent exemplary functional connections and/or physical or logical connections between the various elements, and various alternative or additional functional connections, physical connections, or logical connections may be present in a practical apparatus. Also, no element may be essential to the practice of the inventive concept unless the element is specifically described as "essential" or "critical".

The use of the terms "a", "an", and "the" and similar referents in the context of the specification (especially in the context of the following claims) may be construed as covering both the singular and the plural. Also, recitation of a range of values herein are merely intended to serve as a shorthand method of referring individually to each separate value falling within the range, unless otherwise indicated herein, and each separate value is incorporated into the specification as if it was individually recited herein. Also, the operations of the method described herein may be performed in any suitable order unless otherwise indicated herein or otherwise clearly contradicted by the context. The scope of the inventive concept is not limited to the above-described operation order. All examples or exemplary terms (e.g., "such as") provided herein are merely used to describe the inventive concept in detail, and the scope of the inventive concept is not limited by the examples or exemplary terms unless otherwise claimed. Also, those of ordinary skill in the art will readily understand that various modifications and combinations may be made according to design conditions and factors without departing from the spirit and scope of the inventive concept as defined by the following claims.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A system for generating a facility abnormality prediction model, the system comprising:
    at least one memory configured to store at least one computer executable instruction; and
    at least one processor configured to execute the at least one computer executable instruction to implement at least one module comprising:
        a data receiver configured to receive complete data of sensors of a facility previously obtained during an operation of the facility;
        an abnormality notification time predictor configured to predict a malfunction time of a malfunction of the facility based on the complete data of the sensors, and determine an abnormality notification time for pre-notification of the malfunction of the facility based on the detected malfunction time;
        an optimal sensor combination calculator configured to generate a chromosome based on the complete data of the sensors, and perform a genetic algorithm using the generated chromosome to calculate an optimal sensor combination which is a combination of sensor data related to the determined abnormality notification time; and
        a facility abnormality prediction model generator configured to generate the facility abnormality prediction model to be used for the pre-notification of the malfunction of the facility, based on the optimal sensor combination, and predict the pre-notification of the malfunction of the facility based on the generated facility abnormality prediction model,
    wherein the abnormality notification time predictor is configured to predict the malfunction time of the malfunction of the facility based on a comparison of an accumulate loss rate change and a predetermined pattern,
    wherein the accumulate loss rate is a rate at which accumulation of abnormal facility products are produced according to the operation of the facility measured at predetermined intervals, and
    wherein the optimal sensor combination calculator comprises:
        a first chromosome defining module configured to generate a first chromosome based on the complete data of the sensors;
        a data dividing module configured to divide the complete data of the sensors into training data and testing data;
        a temporary model generating module configured to generate a temporary model from the first chromosome; and
        a model suitability calculator configured to train the temporary model with the training data, and apply the testing data to the trained temporary model to determine a model suitability.

2. The system of claim 1, wherein the data receiver is configured to receive production data, which is a numerical representation of facility products which are produced whenever an operational cycle of the facility is completed, and the complete data of the sensors, and synchronize the production data with the complete data of the sensors based on information about time points when the production data and the complete data of the sensors are obtained by the data receiver.

3. The system of claim 1, wherein the optimal sensor combination calculator is configured to generate the chromosome based on the complete data of the sensors by using a receding horizon control method.

4. The system of claim 1, wherein the optimal sensor combination calculator comprises
    a suitability comparing module configured to determine the combination of sensor data, which is used to generate the temporary model, as the optimal sensor combination in response to the determined model suitability satisfying a preset condition.

5. The system of claim 4, further comprising a next-generation chromosome defining module configured to redefine the first chromosome used for the generating the temporary model as a previous-generation chromosome in response to the determined model suitability not satisfying the preset condition, and define a next-generation chromosome by applying crossover and mutation to the previous-generation chromosome,
    wherein the temporary model generating module is configured to generate a model from the next-generation chromosome, and update the generated model as another temporary model,
    wherein the model suitability calculator is configured to generate a trained temporary model by training the updated temporary model with the training data, calculate a suitability by applying the testing data to the trained temporary model, and update the determined model suitability, and
    wherein the suitability comparing module is configured to determine the combination of sensor data, which is used to generate the updated temporary model, as the optimal sensor combination in response to the updated model suitability satisfying the preset condition.

6. The system of claim 4, wherein the first chromosome defining module is configured to receive information about a variable, which varies according to a type of the temporary model, from the temporary model generating module, and generate the first chromosome from the received information and the complete data of the sensors.

7. The system of claim 4, wherein the temporary model is generated by using a support vector machine, and
    wherein the model suitability calculator is configured to calculate the model suitability by applying the testing data converted by an input vector to the trained temporary model.

8. The system of claim 5, wherein the first chromosome and the next-generation chromosome comprise a kernel function parameter of a support vector machine represented by a binary number.

9. The system of claim 1, wherein the optimal sensor combination calculator is further configured to perform a generic algorithm to select sensor data which is related to the malfunction of the facility among the complete data of the sensors.

10. A method of generating a facility abnormality prediction model by at least one processor, the method comprising:
controlling the processor to receive complete data of sensors of a facility previously obtained during an operation of the facility;
controlling the processor to predict a malfunction time of a malfunction of the facility based on the complete data of the sensors, and determine an abnormality notification time for pre-notification of the malfunction of the facility based on the detected malfunction time;
controlling the processor to generate a chromosome based on the complete data of the sensors, and performing a genetic algorithm using the generated chromosome to calculate an optimal sensor combination which is a combination of sensor data related to the determined abnormality notification time; and
controlling the processor to generate the facility abnormality prediction model to be used for the pre-notification of the malfunction of the facility, based on the optimal sensor combination;
predicting the pre-notification of the malfunction of the facility based on the generated facility abnormality prediction model,
wherein the controlling the processor to predict the malfunction time of the malfunction of the facility is based on a comparison of an accumulate loss rate change and predetermined pattern, and
wherein the accumulate loss rate is a rate at which accumulation of abnormal facility products produced according to the operation of the facility measured at predetermined intervals, and
wherein the controlling the processor to calculate the optimal sensor combination comprises:
controlling the processor to generate a first chromosome from the complete data of the sensors;
controlling the processor to divide the complete data of the sensors into training data and testing data;
controlling the processor to generate a temporary model from the first chromosome; and
controlling the processor to train the temporary model with the training data, and apply the testing data to the trained temporary model to determine a model suitability.

11. The method of claim 10, wherein the controlling the processor to receive the complete data of the sensors comprises:
controlling the processor to receive production data, which is a numerical representation of facility products which are produced whenever an operational cycle of the facility is completed, and the complete data of the sensors; and
controlling the processor to synchronize the production data with the complete data of the sensors based on information about time points when the production data and the complete data of the sensors are obtained.

12. The method of claim 10, wherein the controlling the processor to calculate the optimal sensor combination comprises controlling the processor to generate the chromosome based on the complete data of the sensors by a receding horizon control method.

13. The method of claim 10, wherein the controlling the processor to calculate the optimal sensor combination comprises:
controlling the processor to determine the combination of sensor data, which is used to generate the temporary model, as the optimal sensor combination in response to the determined model suitability satisfying a preset condition.

14. The method of claim 13, further comprising controlling the processor to redefine the first chromosome used for the generating the temporary model as a previous-generation chromosome in response to the determined model suitability not satisfying the preset condition, and define a next-generation chromosome by applying crossover and mutation to the previous-generation chromosome,
wherein controlling the processor to generate the temporary model comprises:
controlling the processor to generate a model from the next-generation chromosome, and
controlling the processor to update the generated model as another temporary model,
wherein the controlling the processor to train and apply comprises controlling the processor to generate a trained temporary model by training the updated temporary model with the training data,
controlling the processor to calculate a suitability by applying the testing data to the trained temporary model, and
controlling the processor to update the determined model suitability, and
wherein the controlling the processor to determine the combination of sensor data comprises controlling the processor to determine the combination of sensor data, which is used to generate the updated temporary model, as the optimal sensor combination in response to the updated model suitability satisfying the preset condition.

15. The method of claim 13, wherein the controlling the processor to generate the first chromosome comprises controlling the processor to receive information about a variable, which varies according to a type of the temporary model, and generate the first chromosome from the received information and the complete data of the sensors.

16. The method of claim 13, wherein the temporary model is generated by using a support vector machine, and
wherein the controlling the processor to train and apply comprises controlling the processor to calculate the model suitability by applying the testing data converted by an input vector to the trained temporary model.

17. The method of claim 14, wherein the first chromosome and the next-generation chromosome comprise a kernel function parameter of a support vector machine represented by a binary number.

18. A non-transitory computer-readable recording medium that stores a program that performs the method of claim 10 when executed by a computer.

* * * * *